2,749,309

WELL DRILLING FLUIDS

Clark C. Heritage, Tacoma, Wash., assignor to Weyerhaeuser Timber Company, Tacoma, Wash., a corporation of Washington No Drawing. Application August 16, 1951,
Serial No. 242,180

8 Claims. (Cl. 252—8.5)

This invention relates to drilling fluids employed in rotary well drilling, and to the use of selected components of the bark of trees as conditioning agents for well drilling fluids. This application is a continuation-in-part of application Serial No. 678,891, filed June 24, 1946, now abandoned.

Well drilling fluids are colloidal suspensions of selected clays in water, to which may be added various materials for altering, modifying, or influencing existing properties, or for providing new and different properties and characteristics to the fluid. The fluids are known in drilling parlance as "muds," to which may be added weighting materials for obtaining a liquid of low viscosity and high specific gravity, thixotropic colloids for increasing vscosity and gel strength, inerts such as inert clays which give body to the fluid, and chemical conditioning materials for influencing such properties as viscosity, filtration rate, gelling, etc.

The general function of the drilling fluid is to act as a lubricant and cooling medium for the bit and drill stem to remove cuttings and detritus from the well, and to hold the cuttings in suspension and prevent them from settling when the circulation of the fluid is stopped. The efficiency with which the drilling fluid performs this function is determined by its thixotropic properties, i. e., its ability to thicken upon remaining quiescent and to become fluid upon agitation. An efficient drilling fluid deposits a thin, impermeable filter cake on the walls of the hole, thus sealing the walls of the hole and reducing loss of water from the fluid to the formation. The filter cake serves to bridge formation pores and plug smaller openings in the formation walls, and to prevent caving or sloughing of the walls. The weight of the fluid should be sufficient to prevent expulsion by formation liquids, but not so great as to cause invasion of the drilling fluid into formations encountered by the bit.

The important properties of a drilling mud which are usually tested are the mud weight or density, viscosity, gel strength, filtration rate or water loss, filter cake thickness, pH, and mud loss or potential of the mud to pass bodily through the pores of the sand. These properties are largely physical, but chemical constituents markedly influence these physical properties.

The properties desired for well drilling fluids are determined largely by the types and nature of the earth formation in which drilling operations are being conducted. These properties are obtained by selection of the kinds of clay most nearly providing these properties, or potentially having such properties which can be developed by the treatment of the clay with additives and conditioners. It is desired that the clay and the combination therewith of additive materials be such that the clay can be treated to modify one or more particular properties, as necessitated by changing conditions of drilling, without affecting adversely the stability of other properties.

The instant invention is predicated upon the discovery that certain components of the barks of trees, namely, parenchyma tissue, sclerenchyma tissue, phelloderm and cork comprise a group of materials capable of imparting desirable qualities to drilling fluids, and that these may be used singly or in combination to provide the required flexibility of the properties of the fluid. The bark products described herein, possibly by reason of their chemical reactivity toward other constituents of the drilling fluid, may be used for the purpose of modifying the viscosity and weight of the fluid, reducing the pH, decreasing or maintaining the gel time, providing optimum filtration characteristics of the fluid, and enabling the deposit of a thin, tough filter cake on the walls of the hole. The use of these bark products as conditioners for well drilling fluids permits desired modifications to be made in particular properties of the fluid without affecting adversely other properties required for a satisfactory drilling fluid.

The bark products referred to comprise the cork, and the parenchyma tissue and sclerenchyma tissue of the bark phloem. These products may be obtained from the barks of trees, for example the barks of the coniferous trees of commerce, by a process which comprises adjusting the friability of the bark matrix as by controlling its water content, so that a suitable comminuting process such as ball milling may be employed to pulverize the constituents of the bark differentially while simultaneously breaking the bonds therebetween so as to permit separation of these constituents by selective screening. Processes providing a combination of comminuting and screening steps, in order to provide substantially the pure tissue components and certain mixed fractions of the same, are disclosed in Patents No. 2,437,672, issued March 16, 1948, to Herman W. Anway, for Method of Treating Bark; No. 2,444,929, issued July 13, 1948, to Raymond S. Hatch, for Method of Treating Bark; and No. 2,446,551, issued August 10, 1948, to Robert D. Pauley, for Separation of Pure Bark From Finely Comminuted Bark; and are also disclosed in application Serial No. 572, filed January 5, 1948, by Bror L. Grondal and Calvin L. Dickinson, for Method Of Treating Bark, which application is owned by the assignee of this invention.

As obtained from the above described or similar processes, the phellem or cork fraction is isolated in the form of particles or flakes of a spongy and resilient character having a particle size of, for example, plus 28 mesh screen. This product may be obtained substantially free from the other components, and is referred to herein simply as "cork."

There may also be produced, as a result of the practice of a process such as is described above, a product comprising essentially bast fibers or stone cells. The bast fibers are usually obtained in the form of elongated fibers having a diameter such as will enable them to pass through a 65 mesh screen, and having a length of, roughly, ten diameters. Stone cells are characterized by having diameters essentially alike, and may be roughly rounded, polyhedral, short cylindrical, or very irregular, in general, the stone cells being without particular form. These usually are of a size as to be retained on a 65 mesh screen.

The parenchyma tissue as derived from the bark of the Douglas fir, for example, being readily disintegrated by the action of a ball mill, may be obtained in the form of a powder of relatively small particle size, for example, a powder which will pass through a 65 mesh screen. On the other hand, the green parenchyma of the Ponderosa pine, known technically as phelloderm, may be obtained in substantially pure form in relatively large particle sizes, the nature of this product being such that the phelloderm may be recovered on the largest screens employed in any particular process for separating the bark contituents.

The above described bark components and various mixtures of the same have been used successfully in the present invention. For convenience in identifying them and referring to them in connection with the data and tests subsequently described herein, each component and mixture used in the tests reported herein is listed below and given a code designation by which it is referred to hereinafter.

| | Cork, Percent | Fiber, Percent | Parenchyma, Percent |
|---|---|---|---|
| Silvacon 144 | 90±2 | 8±2 | 2 |
| Silvacon 218 | 9±2 | 42±5 | 49±5 |
| Silvacon 383 | 68±5 | 32±5 | 2 |
| Silvacon 412 Silvacon 412G (micropulverized) | 22±5 | 78±5 | 2 |
| Silvacon 490 | 5±2 | 2±1 | 93±2 |
| Silvacon 508 | 10±2 | 90±2 | 2 |

It will be apparent, further, that in a process such as that described above for differentially pulverizing bark, and separating the constituents thereof by selective screening, there may also be obtained products comprising mixtures of said constituents. There may be obtained, for example, a product principally comprising from 30% to 90% by weight fiber and 10% to 70% by weight cork. This also may be employed in the practice of the invention.

The percentage composition of the three tissue components of bark varies considerably with respect to the barks of different species of trees; with respect to the barks of different trees of the same species, depending on the age of the tree; geographical location, and other such factors; and even from different portions of the bole of the same tree. An indication of the variation in content of tissue components of the barks of different species of trees will be seen from inspection of Table I, below, showing a percentage analysis of three typical western coniferous trees, as follows: Douglas fir (*Pseudotsuga taxifolia*), western hemlock (*Tsuga heterophylla*), and white fir (*Abies concolor*).

TABLE I

| Botanical Components of Bark | Douglas Fir (*Pseudotsuga taxifolia*) | Western Hemlock (*Tsuga heterophylla*) | White Fir (*Abies concolor*) |
|---|---|---|---|
| | Percent | Percent | Percent |
| Cork | 25 | 5 | 40 |
| Phloem: | | | |
| A. Sclerenchyma— | | | |
| 1. Fiber | 40 | | |
| 2. Stone Cells | | 45 | 45 |
| B. Parenchyma— | | | |
| 1. Mostly sieve cells | 35 | 50 | 15 |

The foregoing bark products are compatible with the other materials customarily employed in the formulation of drilling fluids. They may be used, for example, in conjunction with most types of bentonitic clays; weighting materials such as barium sulphate, strontium sulphate, iron oxide, pulverized iron, silica flour, etc.; inert clays derived from various sources; chemical conditioning materials including sodium hydroxide, sodium carbonate, sodium bicarbonate, sodium silicate, tannins, various phosphates, etc., sodium alginate, various gums, and starch.

The amounts or proportions of bark products to be incorporated in the drilling fluids are largely variable depending upon such factors as the type of drilling fluid, the constituents present in the fluid other than the bark products, the type of formations encountered during drilling, and others. In general, even relatively small amounts of bark products, e. g. amounts of from .35 pound per barrel of fluid have been successfully employed for imparting desirable properties and characteristics to the finished fluid. Substantially larger proportions of the bark product, as, for example, about 10 pounds per barrel have been successfully used. Preferred usages of bark are indicated hereinafter in connection with the report of specific tests under specific conditions, but, in general, is about 4 pounds per barrel of fluid. Other components, e. g., weighting materials, may be present in the same relative proportions in which they customarily are used in preparing drilling fluids.

The methods employed in formulating the drilling fluids of the invention are, generally speaking, those customarily employed in the art for such operations. Thus, suitable clays and water may be admixed until the desired degree of hydration of the clay has taken place. The bark product, together with any other desired constituents, is then incorporated in the mixture and the resulting composition stirred or otherwise agitated as by pumping until all of the components are thoroughly blended together and a substantially uniform mixture is obtained.

*Testing procedures and mud characteristics*

The standard testing procedure for well drilling fluids is that set forth in API Code No. 29, Second Edition, July 1942, published by the American Petroleum Institute. The tests reported herein were conducted in accordance with the API testing procedure, except where otherwise noted. The usual and customary tests are mud weight or density, expressed in pounds per gallon (p. p. g.); viscosity, as determined by the Stormer viscosimeter, expressed in centipoises (cps.); gel or shear strength, which is measured initially and after allowing the mud to set for ten minutes; water loss in cubic centimeters (ccs.) of filtrate in 30 minutes; cake thickness in 32nds of an inch; and pH. Water loss and filter cake thickness are tested on the API wall builder equipment.

*Density.*—The general function of mud density, so far as necessity for its control is concerned, is to provide the desired hydrostatic head against the formation pressures encountered. The fluid should have a density such that its hydrostatic pressure will be sufficient to prevent displacement of the fluid from the well by the pressures encountered in the earth formations through which the bore passes, but the density should not be so great as to cause invasion of the drilling fluid into formations encountered by the bit. The bark fractions of the present invention do not materially affect the mud weights in most instances, and when they do, it is usually to lower the mud weight, due both to their relative low specific gravity and to a tendency of the bark to foam in the alkaline mud.

*Viscosity.*—A general objective for viscosity is that it be sufficient to provide enough body to the fluid to lift the cuttings to the surface, but not so high as to make it difficult to circulate the fluid through the pump and well. There are occasional times when it is necessary to increase the viscosity, but more often the problem is to lower the viscosity, inasmuch as the colloidal reaction of the clay with water during the hydration of the fluid tends to make the fluid viscous. Practically all contaminants, such as cement, salt, anhydrytes and oil also increase viscosity. Upper limits of a usable viscosity are usually about 200 centipoises Stormer, but it is preferred that the viscosity be more nearly in the order of 30 centipoises Stormer.

*Shear strength.*—Gel or shear strength is the measure of the thixotropic property of the mud; i. e., its ability to thicken upon becoming quiescent and to become fluid upon agitation. An ideal drilling mud is one which is thixotropic, so that upon agitation by pumping or otherwise it will have a relatively low viscosity and is free flowing, but, when agitation is stopped, it sets or gels. Its gelling property enables it to suspend the drilling cuttings during cessation or interruption of drilling, which would otherwise settle back to the bottom of the hole. Gel is closely associated with viscosity and the same factors which increase viscosity will usually increase gel strength, and, vice versa, the factors which lower viscosity will lower gel strength.

*Water loss.*—Water loss is the measure of the degree with which water separates from the colloidal suspension by absorption in the earth formation surrounding the well bore. As water loss occurs, the filter cake deposited on the walls of the bore will obviously thicken, because the cake is made up of the residue of the dehydrated mud. The dangers from high water loss are (1) the filter cake may get too thick and the drill may stick, (2) water entering the earth formation may cause caving and sloughing of the walls of the well bore, (3) water in the oil bearing regions makes completion of the boring difficult and tends to retard flow of oil into the well. It is, therefore, always desired to reduce water loss to the lowest possible value. Except for the fact that a thin, tough film of filter cake on the walls serves to reduce water loss, it is always desirable to reduce the filter cake thickness to the smallset possible value in order to provide maximum clearance for the bit.

nents, but the parenchyma tissue seemed to provide the greatest degree of water loss reduction. The gel strength on four of the five samples was already at zero pounds per 100 square feet, and no change was recorded by any of the three bark tissues on these four samples. On the fifth sample, the ten minute gel strength was reduced about 20% by each of the three bark products. Mud weight and cake thickness were not substantially affected by any of the products. The pH was lowered slightly in each case, with the parenchyma tissue causing the greatest change, the cork tissue the next, and the fiber the least.

TABLE II

| Mud Sample Nos. and Description | Water-base mud of Terra-Gel Rogers Lake clay from Edison Field | | | | Water-base mud from Wilmington Field (treated) | | | | Water-base mud, Baroid Chemical, from Rio Vista Field (treated) | | | | A Roto-Gel mud (bentonite) from Wilmington Field | | | | Water-clay-oil emulsion type mud from Wilmington Field | | | |
|---|---|---|---|---|---|---|---|---|---|---|---|---|---|---|---|---|---|---|---|---|
| Type of Additive | None | 508 | 490 | 144 | None | 508 | 490 | 144 | None | 508 | 490 | 144 | None | 508 | 490 | 144 | None | 508 | 490 | 144 |
| Brookfield Viscosity in cp | 140 | 110 | 680 | 190 | 1,930 | 1,640 | 1,950 | 1,840 | 200 | 120 | 190 | 140 | 700 | 490 | 880 | 590 | 550 | 390 | 760 | 530 |
| Initial Shear Strength in #/100 Sq. Ft. | 0 | 0 | 0 | 0 | 8.8 | 8.8 | 9.5 | 9.3 | 0 | 0 | 0 | 0 | 0 | 0 | 0 | 0 | 0 | 0 | 0 | 0 |
| 10 Min Shear Strength in #/100 Sq. Ft. | 0 | 0 | 0 | 0 | 12 | 9.9 | 10.0 | 10.0 | 0 | 0 | 0 | 0 | 0 | 0 | 0 | 0 | 0 | 0 | 0 | 0 |
| Mud Density, #/Gal | 9.31 | 9.28 | 8.90 | 9.15 | 10.58 | 10.55 | 10.30 | 10.40 | 9.72 | 9.65 | 9.50 | 9.55 | 9.70 | 9.55 | 8.33 | 9.51 | 8.51 | 8.61 | 8.62 | 8.58 |
| 15-Min. Water Loss (cc) | 8.4 | 7.3 | 7.0 | 7.0 | 12.2 | 11.5 | 11.6 | 11.9 | 8.9 | 7.1 | 7.7 | 8.0 | 13.9 | 12.5 | 13.7 | 12.7 | 3.0 | 3.3 | 2.0 | 2.5 |
| 30-Min. Water Loss (cc) | 11.6 | 10.2 | 9.9 | 10.1 | 17.0 | 16.2 | 16.5 | 16.7 | 12.1 | 10.3 | 10.9 | 11.4 | 19.0 | 17.4 | 18.7 | 17.6 | 4.0 | 4.5 | 2.5 | 3.7 |
| 60-Min. Water Loss (cc) | 16.4 | 14.2 | 10.1 | 14.3 | 23.8 | 23.0 | 23.4 | 23.4 | 16.7 | 14.7 | 15.1 | 15.9 | 26.5 | 24.7 | 26.0 | 24.8 | 5.3 | 6.2 | 3.7 | 5.0 |
| Cake Thickness in 32nds of an inch | 4− | 4− | 4− | 4− | 5+ | 5 | 5+ | 5 | 4+ | 4 | 4− | 4− | 4 | 4 | 4 | 4 | 1− | 1− | ½− | 1− |
| pH | 9.90 | 8.85 | 7.90 | 8.42 | 8.47 | 7.38 | 6.85 | 7.20 | 8.54 | 7.54 | 7.01 | 7.12 | 8.43 | 7.78 | 7.22 | 7.52 | 9.72 | 9.42 | 8.72 | 9.05 |

*pH.*—The hydrogen ion concentration or pH is general not, in and of itself, critical, except to the extent that it is a measure of changing conditions in the fluid which will affect viscosity, gel strength and water loss. Control of the pH may, therefore, be a useful tool for controlling or preventing changes in viscosity, gel strength and water loss. In general, the clays are alkaline, but no general statements can be made as to optimum pH values.

*Mud loss.*—Another characteristic of drilling fluids is the loss of the mud, as an entity, to relatively sound earth formation, and particularly in the production zone where the mud penetrates the oil bearing sands. This mud loss is distinguished from water loss in that in water loss only the water passes to the formation as a filtrate. In mud loss, the entire mud passes into the formation without separation into the water and clay constituents. Mud loss of this type is also to be distinguished from the mud loss of "lost circulation," wherein the mud exhausts into the larger pores or cavernous crevises in the earth formation through which the hole progresses. Laboratory experiments and production data indicate that there is an infiltration of mud into the production zone which retards the flow of oil to the hole and so reduces the productivity of the well. A further discussion of the characteristic of mud loss and its prevention, and a testing method for the same, is set forth hereinafter in connection with the tests illustrating the favorable reduction in mud loss brought about by the use of the bark products of the present invention.

*General effect of substantially pure bark tissue components on characteristics of well drilling muds*

Oil well drilling fluids were treated with substantially pure tissue components of bark to determine what properties of muds, in general, are affected thereby, and to what degree. Five different muds, including one oil-emulsion type mud, from actual drilling operations, each was treated with 7 pounds per barrel of each of the three bark tissue components, Silvacon 490, Silvacon 508 and Silvacon 144. It was discovered that the fiber tissue component (Silvacon 508) was quite useful for reducing viscosity in each case, with the viscosity reduction ranging from 14½ to 43%. In almost all instances water loss was reduced from 10 to 20% by each of the three bark tissue compo- In other tests comparison was made between substantially pure parenchyma tissue and fiber in their effects on treatment of water-base drilling mud, when used together with caustic soda in the ratio of four parts bark to one part caustic, by weight. These results are shown in Table V hereof, columns B, C, and E, F, under the section on Treatment of water-base muds. It will be observed, by reference to Table V, however, that the fiber reduced viscosity to a considerably greater extent than parenchyma tissue, but parenchyma tissue was more effective in reducing water loss. Tests have shown that the fiber is effective for reducing viscosity of the drilling fluid when used in amounts as small as .35 lb. per barrel of fluid. A practical upper limit for this purpose may be set at 10 lbs. per barrel.

*Treatment of water base muds*

It has been found that best results in the treatment of water base muds is had by the use of bark products and caustic soda in a ratio of about 4 parts of bark to 1 part of caustic soda, by weight, with the bark at usages of about 4 pounds per barrel of drilling mud. For the data shown in Table III, below, a mud representative of a typical hole-made mud was prepared by mixing approximately 1 part of bentonite, 2 parts Dixie clay (a very slightly hydratable, kaolin type of clay) and 14 parts water. The bentonite was added in the form of a completely hydrated slurry. The mud had a solids content of about 19%. The characteristics of the mud before treatment are shown in column A of Table III. The bark and caustic used as treating agents were added in a slurry containing 20 pounds of water per barrel for each 4 pounds of bark per barrel.

Several tests were run in order to determine to what extent each ingredient in the Silvacon-caustic treating slurries affected the final results. From the data obtained from these tests it appears that water alone causes a viscosity reduction and a slight increase of water loss. Caustic, without Silvacon, causes extreme flocculation with corresponding increases in viscosity and water loss. Silvacon 218, without caustic, causes excellent viscosity reduction, but only a slight decrease in water loss. A treating agent made up of Silvacon 218 and caustic soda in a ratio of 4 to 1 showed excellent water-loss and viscosity reducing properties.

TABLE III

*Effect of Silvacon 218 on high viscosity, high water loss, water-base mud*

| Column | A | B | C | D |
|---|---|---|---|---|
| Bark, p. p. b | 0 | 4 | 1 | 4 |
| Caustic, p. p. b | 0 | 0 | .25 | 1 |

TESTS IMMEDIATELY UPON MIXING

| | | | | |
|---|---|---|---|---|
| Weight, p. p. b | 9.36 | 9.33 | 9.30 | 8.81 |
| Viscosity (Stormer, cp.) | 110 | 38 | 28 | 37 |
| Initial Gel Strength (gms.) | 130 | 12 | 4 | 5 |
| 10 min. gel strength | 140 | 25 | 7 | 8 |
| Water loss (cc. 30 in.) | 22 | 21.7 | 18 | 14.4 |
| Cake thickness (1/32") | 7 | 5 | 4 | 4 |
| pH | 6.4 | 5.4 | 8.9 | 10.8 |

AGED BY HEATING TO 180° F. FOR 2 HRS.

| | | | | |
|---|---|---|---|---|
| Weight | 9.32 | 9.28 | 9.20 | 8.33 |
| Viscosity | 115 | 33 | 30 | 34 |
| Initial gel strength | 140 | 6 | 5 | 5 |
| 10 min. gel strength | 160 | 16 | 8 | 6 |
| Water loss | 22.1 | 21.7 | 17.8 | 15.5 |
| Cake thickness | 6 | 5 | 4 | 4 |
| pH | 6.4 | 5.3 | 7.9 | 9.9 |

It will be observed from Tables III and IV that marked improvement was obtained in viscosity, shear strength and cake thickness by the use of bark alone without caustic soda; that the greatest reduction in viscosity was obtained by the smallest usage of bark as shown in column C of Table III; and that a reduction of water loss of about 20% or more was obtained using bark and caustic in the ratio of 4 parts bark to 1 caustic.

Table IV is an extension of the tests conducted in Table III, using the same mud and the same bark mixture, but disclosing a larger range of usages. The purpose of Table IV is primarily to show the inverse ratio of results, pointed out above, with respect to change in viscosity and water loss brought about by successively increasing usages of bark. It is also interesting to note in column G that treatment with caustic alone greatly increased the viscosity to the point where it is not measurable, and increased even the originally high water loss.

TABLE IV

*Effect of variation in usages of Silvacon 218 on viscosity and water loss of mud in Table III*

TESTS IMMEDIATELY UPON MIXING

| Column | A | B | C | D | E | F | G |
|---|---|---|---|---|---|---|---|
| Bark, p. p. b | 0 | 1 | 2 | 3 | 4 | 4 | 0 |
| Caustic, p. p. b | 0 | .25 | .5 | .75 | 1 | 0 | 1 |
| Viscosity | 110 | 28 | 29 | 36 | 37 | 38 | V. F. |
| Water loss | 22 | 18 | 17.5 | 16.2 | 14.4 | 21.7 | 23.1 |

V. F.—Very flocculated; so viscous, not measurable.

In Table V, below, a series of tests were run to determine the relative effects of other bark tissue components and the preferred bark product of 10% cork, 40% fiber and 50% parenchyma tissue (Silvacon 218). The mud was a high viscosity, high water loss mud quite similar to that used in Tables III and IV. It consisted of 1 part by weight of bentonite, 2⅔ parts of Dixie clay, and 18 parts water. The API characteristics of this mud are given in column A in Table V. The bark and caustic were added in a slurry containing 20 parts of water. Slurries were prepared of the following bark products:

1. 4 parts Silvacon 218
2. 4 parts Silvacon 508
3. 4 parts Silvacon 490
4. 4 parts 50% Silvacon 490 and 50% Silvacon 508
5. 4 parts 65% Silvacon 490 and 35% Silvacon 508
6. 4 parts 70% Silvacon 412 and 30% Silvacon 490
7. 4 parts Silvacon 412

The results of tests are shown in the following table. It appears that a blend of 65% Silvacon 490 and 35% Silvacon 508 produces results very similar to those produced by Silvacon 218. By and of itself, Silvacon 490 is more chemically active than Silvacon 218, as shown by lower pH and water loss values. Conversely, Silvacon 508 is less active than Silvacon 218, as shown by higher pH, 10-minute shear and water loss values. The blend of 65% parenchyma tissue and 35% fiber is substantially as active as the Silvacon 218 blend of 10% cork, 40% fiber and 50% parenchyma tissue.

TABLE V

*Effect of different bark products on high viscosity, high water loss, water-base mud*

BARK AND CAUSTIC ADDED IN A SLURRY CONTAINING 20 P. P. B. OF WATER PER 4 P. P. B. BARK

| Column | A | B | C | D | E | F | G | H | I |
|---|---|---|---|---|---|---|---|---|---|
| Bark Product | None | 508 | 490 | 218 | 65% 490 / 35% 508 | 508 | 490 | 218 | 218 |
| Bark, p. p. b | 0 | 4 | 4 | 4 | 4 | 2 | 2 | 2 | 1 |
| Caustic, p. p. b | 0 | 1 | 1 | 1 | 1 | .5 | .5 | .5 | .25 |

TESTS IMMEDIATELY UPON MIXING

| | | | | | | | | | |
|---|---|---|---|---|---|---|---|---|---|
| Weight | 9.25 | 8.72 | 8.37 | 8.78 | | | | | |
| Viscosity | 84 | 35 | 47 | 38 | 38 | 35 | 47 | 45 | 30 |
| Initial gel strength | 85 | 6 | 5 | 5 | 5 | 5 | 6 | 5 | 6 |
| 10 min. gel strength | 115 | 25 | 10 | 8 | 8 | 30 | 22 | 20 | 18 |
| 30 min. water loss (cc.) | 18.3 | 15.1 | 10.8 | 12.5 | 12.7 | 15.3 | 13.2 | 13.6 | 15.7 |
| Cake thickness (1/32") | 5 | 4 | 3 | 3 | 3 | 4 | 4 | 4 | 4 |
| pH | 6.7 | 12.0 | 10.7 | 11.0 | 11.1 | 10.8 | 9.9 | 10.0 | 8.9 |

In Table VI comparisons were made between bark products identified as Silvacon 218, Silvacon 412, and Silvacon 383, the latter consisting predominately of cork and being micropulverized through a 0.027 screen. The composition of the mud was as follows: 1 part by weight of bentonite added in the form of a well-hydrated slurry, 3.2 parts of a nonhydratable kaolin type clay consisting of a blend of 1 part Dixie clay and 4 parts china clay; and 17.3 parts of water. The API test characteristics of the untreated mud are shown in Column A of Tavle VI. The mud was then treated with bark products and caustic in amounts of from 2 to 4 pounds of bark and .5 to 1 pound of caustic per barrel of drilling fluid (a ratio of approximately 4 parts bark to 1 part caustic), as shown in the table. The bark was added to the mud in dry form and the caustic was added as a 50% solution.

TABLE VI

*Effect of different bark products on high viscosity, high water loss, water-base mud*

| Column | A | B | C | D | E | F | G | H |
|---|---|---|---|---|---|---|---|---|
| Bark Product | None | 218 | 383M | 218 | 412 | 218 | 412 | 383M |
| Bark, p. p. b. | 0 | 2 | 2 | 3 | 3 | 4 | 4 | 4 |
| Caustic, p. p. b. | 0 | .5 | .5 | .75 | .6 | 1 | .8 | 1 |
| Weight | 9.47 | 9.38 | 9.45 | 9.44 | 9.45 | 9.44 | 9.44 | 9.44 |
| Viscosity | 49 | 52 | 50 | 51 | 41 | 45 | 32 | 41 |
| Initial gel strength | 47 | 6 | 5 | 6 | 6 | 5 | 5 | 6 |
| 10 min. gel strength | 96 | 29 | 24 | 8 | 31 | 8 | 25 | 7 |
| Water loss | 16.9 | 13.7 | 13.7 | 13.2 | 13.8 | 13.0 | 13.9 | 13.5 |
| Cake thickness | 4 | 4 | 4 | 4 | 4 | 4 | 4 | 4 |
| pH | 6.7 | 10.6 | 10.6 | 11.1 | 11.1 | 11.5 | 11.6 | 11.6 |

The improved results of treatment of water-base muds with bark mixture 218 noted in laboratory tests were confirmed in a number of actual drilling operations. Observations made during actual drilling operation have shown that the bark should be added to the mud first, followed by the caustic, and that each ingredient should be added during one cycle of circulation. The bark can be added dry, but it is recommended that the caustic soda be added in solution form at a steady rate.

The bark reduces the gel requirement for the mud because of the capacity of bark-treated muds to be thinned with water without marked increase in water loss. This, in turn, eliminates the need for viscosity reducing agents. This property of the bark results, at least in part, from the presence of the bast fibers which mechanically reduce water loss and are not chemically consumed in the treatment, nor affected by dilution of the mud with water in limited amounts.

Pore-bridging or mud loss prevention

The loss of mud referred to is a gradual loss to sound earth formations, and is to be distinguished from the loss of mud generally referred to as "lost circulation." This loss is particularly objectionable in the oil production zone where the mud penetrates the oil bearing sand and the flow of oil to the hole is substantially retarded. Unless properly treated, whole mud will flow through the pore channels until the proper size solid particles happen along to bridge the openings. Thus, appreciable amounts of whole mud are lost to the formation before a mud cake is formed. This intrusion of solid particles into the pore channels of a producing formation will reduce or even stop the flow of oil through these channels when a well is put on production.

It will be recognized that the nature of this improvement is not so much related to the well drilling fluid characteristics in its effect upon the conduct of the drilling operation as it is in connection with the improvement in the yield of oil from the well. The only difference so far as the well drilling operation is concerned is that the consumption of mud used is reduced. This is in and of itself an important improvement as it reduces the cost of drilling. However, it should be understood that the improvement in API characteristics of the mud, and reductions of mud loss, may, and do, probably, in most instances, occur simultaneously. The success of bark as a pore-bridging material can probably be attributed to the combined functions it performs in a drilling mud, i. e., chemical dispersion and mechanical bridging.

A typical water-base mud was prepared and tested for mud loss using four different sands. The mud was made by mixing 10% of a bentonite clay mud having 7% solids content and 90% of a Roger's Lake: P-34 mud (native-type clay) having 36% solids content. Water was added so that the mud, when ready for testing, contained about 21.5% solids. An oil emulsion mud, considered to be typical, was prepared by adding to the water base mud thus prepared a Wilmington Field crude oil in an amount such that the final mud ready for testing contained 20% by volume of oil.

One sample of each mud was tested with no treatment; another sample was treated with four pounds per barrel of quebracho; and another sample was treated with four pounds per barrel of bark product, Silvacon 218, consisting approximately of 10% cork, 40% fiber and 50% parenchyma tissue. Tests were conducted immediately after mixing of the muds and the treating agents. Standard API test values and mud loss values determined on both the treated and untreated water-base and oil-emulsion muds are set forth in Table VII, below:

TABLE VII

*Comparison of pore-bridging effects of bark and quebracho with three different filter media sands and two different drilling fluids*

| Tests | Typical Water Base Mud | | | Typical Oil Emulsion Mud | | |
|---|---|---|---|---|---|---|
| Treating Agent | None | Quebracho | Silvacon 218 | | Quebracho | Silvacon 218 |
| Usage | None | 4 p. p. b. | 4 p. p. b. | None | 4 p. p. b. | 4 p. p. b. |
| Weight | 9.58 | 9.59 | 9.41 | 8.58 | 8.52 | 9.03 |
| Viscosity | 14 | 18 | 16 | 28 | 35 | 25 |
| Initial gel strength | 5 | 5 | 4 | 5 | 9 | 5 |
| 10 min. gel strength | 20 | 30 | 20 | 20 | 45 | 25 |
| Water Loss | 14.2 | 13 | 12.7 | 8.8 | 6.3 | 7.2 |
| Cake Thickness | 3 | 2 | 3 | 3 | 2 | 2 |
| pH | 9.3 | 8.2 | 8.3 | 9.3 | 8.2 | 8.2 |
| MUD LOSS—SAND BLAST SAND (MEDIUM SAND—96 DARCYS) | | | | | | |
| 0 min | 60.0 | 35.0 | 18.0 | 15.0 | 13.0 | 9.0 |
| ½ min | 194.0 | 179.0 | 39.0 | (¹) | 230.0 | 38.0 |
| 1 min | 196.3 | 181.0 | 40.8 | | 232.4 | 38.8 |
| 15 min | 203.1 | 186.9 | 47.5 | | 236.5 | 43.2 |
| 30 min | 207.3 | 190.6 | 51.6 | | 238.5 | 45.6 |

TABLE VII.—Continued

MUD LOSS—DEL RAY SAND #20 (MEDIUM SAND—116 DARCYS)

| Tests | Typical Water Base Mud | | | Typical Oil Emulsion Mud | | |
|---|---|---|---|---|---|---|
| Treating Agent | None | Quebracho | Silvacon 218 | | Quebracho | Silvacon 218 |
| Usage | None | 4 p. p. b. | 4 p. p. b. | None | 4 p. p. b. | 4 p. p. b. |
| 0 min | 42.0 | 27.0 | 15.0 | 13.0 | 11.0 | 9.0 |
| ½ min | 180.0 | 218.0 | 47.0 | (¹) | (¹) | 38.0 |
| 1 min | 182.0 | 221.0 | 48.3 | | | 38.8 |
| 15 min | 189.0 | 227.3 | | | | 43.6 |
| 30 min | 193.0 | 230.7 | 61.2 | | | 46.1 |

MUD LOSS—MONTEREY SAND #2 (COARSE SAND—156 DARCYS)

| 0 min | 75.0 | 44.0 | 28.0 | 47.0 | 23.0 | 19.0 |
|---|---|---|---|---|---|---|
| ½ min | (¹) | (¹) | 78.0 | (¹) | (¹) | 83.0 |
| 1 min | | | 79.6 | | | 84.0 |
| 15 min | | | 85.5 | | | 88.0 |
| 30 min | | | 88.8 | | | 90.3 |

¹ Entire sample spurted through the filter in the time within which the pressure was applied.

When a medium sand having a porosity of 96 darcys was employed, a conspicuous difference in mud loss was noted in both the typical water-base mud and the oil-emulsion mud. Only the bark treated samples were sufficiently impermeable to the filter medium to prevent mud loss. As the sand increased in coarseness to 116 darcys in the Del Ray sand and 156 darcys in the Monterey sand, the permeating potential of the muds to the sand filter was even more conspicuously differentiated. It will be seen that the mark treatment greatly reduces the propensity of the mud to pass through the pores of the sand filter, whereas the quebracho provides little more retarding effect than the untreated mud.

Other tests were made with drilling muds of different compositions and using 2 and 5 pounds per barrel of the following treating agents: Silvacon 218; Silvacon 412; Silvacon 412G; Silvacon 490; quebracho; and sodium tetraphosphate, known to the trade and referred to hereinafter as "Quadrofos." The results are shown in the following table:

TABLE VIII

*Comparison of pore-bridging effects of different bark products and different usages*

| Line | Bark Product | Fineness | Usage, p.p.b. | Mud Loss in cc. | |
|---|---|---|---|---|---|
| | | | | 0 Min. | 30 Min. |
| A | None | | 0 | 60 | Sample through in 15 sec. |
| B | Silvacon 218 | −65 | 2 | 22 | 56. |
| C | ...do | −65 | 5 | 14 | 36. |
| D | Silvacon 412 | −28 +65 | 2 | 50 | 118. |
| E | ...do | −28 +65 | 5 | 70 | |
| F | Silvacon 412G | −65 +325 | 2 | 38 | 81. |
| G | ...do | −65 +325 | 5 | 25 | 57. |
| H | Silvacon 490 | −325 | 2 | 40 | 108. |
| I | ...do | −325 | 5 | 13 | 64. |
| J | Quebracho | | 2 | 44 | 153. |
| | | | 5 | 22 | 97. |
| K | Quadrofos | | 2 | 62 | Sample through in 10 sec. |
| | | | 5 | 13 | 106. |

Where excessive mud loss was encountered, the drilling fluid was treated with two pounds per barrel of a bark mixture of approximately 25% cork and 75% fiber (Silvacon 412), of which half the quantity was its normal particle size as produced at the bark plant (−28 +65 mesh) and the other half was −65 +325 mesh size (Silvacon 412G). Mud loss at the well dropped from 25 barrels per hour to a negligible figure. API test characteristics were either improved or not materially affected. Tests on the mud before and after treatment at the well, using a modified mud loss testing procedure in which the sample is passed through a 2 centimeter column of sand having a porosity value of 494 darcys water permeability, were as follows:

TABLE IX

*Effect on mud loss and other properties of well drilling fluid in actual operation by addition of 2 p. p. b. bark mixture*

| | Before treatment | After treatment |
|---|---|---|
| Weight | 9.95 | 9.64 |
| Viscosity | 26 | 24 |
| Initial Gel Strength | 6 | 6 |
| 10 min. Gel Strength | 36 | 16 |
| Water Loss | 13.4 | 13.0 |
| Cake Thickness | 4 | 3 |
| pH | 8.8 | 7.8 |
| Pore Bridging Properties: | | |
| Initial spurt in 30 secs | 92 | 59 |
| Fluid loss 30 mins | 105.3 | 72.9 |

Contaminated muds

The bark tissue components of the present invention have been found to be especially useful for reconditioning contaminated drilling muds, either water base or of the oil-emulsion type. The bark ingredient may be added after the mud has been contaminated, in which case its beneficial effects are referred to as "corrective action," or it may be added before the mud becomes contaminated in anticipation of such event, in which case the beneficial effects of the bark are referred to as "preventative action."

The contaminants commonly encountered in oil well drilling operations are salt, anhydrites such as calcium sulfate, and cement. These cause the drilling fluid to become highly flocculated, with a separation of solids and water and a consequent increase of viscosity and loss of water to the earth formation. The troublesome element in cement contamination is calcium hydroxide or lime. The calcium ion flocculates the clays in the mud, causing the solids to coagulate and the water to pull away. The condition is known to practically every well.

Silvacon 218 has a marked deflocculating effect on a cement contaminated drilling mud, but is not effective when used alone as a treating agent for salt contaminated mud. The addition to bark products of an alkali such as soda ash or caustic soda creates a combined chemical and mechanical action and resuspends the clays. In tests showing use of mark products as treating agents, the untreated mud samples spurted through the filter, leaving mud infiltrated sand. Bark treated mud lays a thin brown layer (⅛″) on the surface of the sand, and all solids and ⅘ of the water remain in the mud.

Tests were conducted adding varying usages of bark products, Silvacon 218 and Silvacon 412, to a cement-contaminated, water base, high bentonite-content drilling mud. The results of this work, as recapitulated in Table X, clearly show the excellent deflocculating and conditioning effect of treating the mud with bark products.

The alkali is added and is stirred into the mud by the action of the pump in circulating the mud through the system. The alkali should be dissolved in water in the chemical barrel and run into the mud at a steady rate. Concentration of the alkali is flexible and can be adjusted to almost any convenient figure, as long as the ratio of solid caustic to bark product is maintained in the neighborhood of 1 to 4. Prior to drilling out cement, the bark

TABLE X

*The effect of Silvacon 218 and Silvacon 412 on cement-contaminated, bentonite drilling mud*

| Cement, #/bbl. | Silvacon, #/bbl. | Stormer Vis. (cp.) | Initial and 10 min. shear values (gms.) | Degree of flocculation | 30 min. water loss | Cake Thickness, 32ds in. | Density | pH |
|---|---|---|---|---|---|---|---|---|
| 0 | 0 | 20− | 15−45 | None | 12.4 | 3− | 8.70 | 8.63 |
| 0 | 4−218 | 20+ | 8−35 | None | 12.2 | 3− | 8.36 | 6.9 |
| 1 | 0 | 54 | 110−230 | F | 14.0 | 5+ | 8.70 | 11.0 |
| 1 | 4−218 | 24 | 7.35 | None | 12.5 | 3 | 8.12 | 9.41 |
| 2 | 0 | VF | VF | VF | 15.0 | 6− | VF | 11.8 |
| 2 | 4−218 | 26 | 8−45 | None | 13.2 | 3 | 8.28 | 10.38 |
| 3 | 4−218 | 43 | 43−120 | F | 14.4 | 5 | 8.44 | 11.12 |
| 2 | 6−412 | 31+ | 20−70 | SF | 13.6 | 3− | 8.61 | 10.87 |

F=flocculated.
SF=slightly flocculated.
VF=very flocculated.

Bark products, used in conjunction with alkali, are effective treating agents for salt contaminated muds. Salt is a commonly encountered contaminant in oil well drilling, and has a very decided effect on the properties of normal water base muds. Primarily, the effect is to break the gel system, and the consequent flocculated muds show high viscosities, shear strengths and water losses. If salt contamination runs over 1%, it is usually cheaper to discard the mud and substitute special salt tolerant mud systems. Even salt contaminations of less than 1% are expensive to treat and provide a most rigid test for the efficiency of a treating material.

In the treatment of salt contaminated muds, an alkali, usually caustic soda, is added to raise the pH of the mud to 11.5 or above. The bark product usage is in amounts of 3, 6, 9, 12 and 15 pounds per barrel. For purposes of the tests reported in the following table, the clay was made into mud by using a 12% brine. The results indicate that a reduction in water loss of any salt contaminated mud is possible by means of treatment with a bark product. The use of bark lowers the high salt induced viscosities and reduces water losses, even in higher contaminated salt muds. The following table shows the effect of bark products as treating agents for a salt contaminated drilling mud.

product should be added to the mud as is, and the addition of caustic should be discontinued.

Bark products are effective in combination with other treating agents to restore cement contaminated muds to useful conditions. The results reported in Table XII, below, show the useful improvement which is to be obtained when a bark product and another treating agent are used in combination; and that the combination generally produces better results than either bark or the other treating agent alone. This knowledge is particularly useful as showing the compatibility of the bark with other treating agents, for it may well be that another treating agent will have been used in the mud prior to the time that it becomes contaminated with cement. It may also be desirable in certain instances to add both bark and another treating agent where the other treating agent has been found to be efficacious in providing a particular characteristic to the drilling fluid. The mud in the tests reported in Table XII was a water base mud made up of a mixture of six parts of a 31% solids, Roger's Lake : P−34 mud, and one part of a 7% solids, bentonite mud. This mud was then contaminated with 2 pounds per barrel of ordinary Portland cement added in the form of a water slurry. The bark and other treating agents were added dry. Tetrasodium pyrophosphate (TSPP) and sodium bicarbonate

TABLE XI

*The effect of Silvacon 218 as a treating agent on salt contaminated mud. 12% contamination*

| Treating agent | Control | 3#/bbl. | 6#/bbl. | 9#/bbl. | 12#/bbl. | 15#/bbl. |
|---|---|---|---|---|---|---|
| Stormer Viscosity | 96 | 76 | 64 | 61 | 64 | 66 |
| Initial and 10-min. shear, gms | 65−65 | 70−70 | 50−50 | 50−50 | 50−50 | 50−50 |
| 30 min. water loss, cc | 115.5 | 62.0 | 61.8 | 56 | 65.9 | 68.2 |
| Cake thickness, 32nd inch | 14 | 10 | 8 | 7 | 10 | 10 |
| pH | 11.9 | 11.8 | 11.7 | 11.7 | 11.4 | 11.2 |

The bark product may be added dry, either directly into the pit or through the hopper, and is distributed evenly throughout the mud by the action of the pump in circulating the mud through the system.

were selected as representative of other treating agents. As between bark and the said other treating agents tested, bark was much superior in water loss and viscosity reduction as will be seen in columns B, C, and F.

TABLE XII

*Effect of bark product, tetrasodium pyrophosphate, and sodium bicarbonate, as treating agents for cement-contaminated, water-base drilling muds*

| Column | A | B | C | D | E | F | G |
|---|---|---|---|---|---|---|---|
| Bark Usage, p. p. b. | 0 | 5 | 0 | 5 | 5 | 0 | 5 |
| TSPP, p. p. b. | 0 | 0 | 2 | 0.5 | 1.5 | | |
| Bicarb., p. p. b. | 0 | 0 | | | | .5 | .5 |
| Weight, p. p. g. | 9.98 | 9.70 | 10.19 | 9.61 | 9.64 | 10.17 | 9.90 |
| Viscosity | VF | 24 | 34 | 25 | 27 | 25 | 20 |
| Initial gel strength | 250 | 4 | 10 | 4 | 5 | 11 | 4 |
| 10 min. gel strength | 350 | 50 | 60 | 40 | 30 | 140 | 20 |
| Water loss | 19.5 | 13.9 | 15.7 | 13.3 | 13.0 | 16.8 | 12.7 |
| Cake thickness | 10 | 5 | 6 | 4 | 4 | 6 | 4 |
| pH | 12.3 | 11.5 | 12.5 | 11.4 | 11.6 | 12.1 | 11.4 |

VF—very flocculated, too viscous to measure.

Having described my invention and how the same may be used, what I claim as new and desire to protect by Letters Patent is:

1. An aqueous drilling mud made up of a major proportion of a suspension of water insoluble clayey material in water and an amount of a mixture of an alkali metal hydroxide and a separated component of the bark of a coniferous tree of the pine, tsuga, pseudotsuga and fir families selected from the group consisting of sclerenchyma tissue, parenchyma tissue, cork and admixtures thereof, the bark component being present in the range of from 0.35 pound to about 10 pounds per barrel of fluid.

2. The aqueous drilling mud of claim 1 in which the clayey material is Mojave clay and the alkali metal hydroxide is sodium hydroxide.

3. The aqueous drilling mud of claim 1 in which the clayey material is bentonite clay and the alkali metal hydroxide is sodium hydroxide.

4. The aqueous drilling mud of claim 1 in which the clayey material is McKittrick clay and the alkali metal hydroxide is sodium hydroxide.

5. A drilling mud comprising an aqueous suspension of a clayey material in water and from about 0.5 to 4.0 pounds of a mixture of an alkali metal hydroxide and a separated component of the bark of a coniferous tree of the pine, tsuga, pseudotsuga and fir families selected from the group consisting of sclerenchyma tissue, parenchyma tissue, cork and admixtures thereof, per barrel of mud, the proportion of the said bark component to fluid being in the range of from 0.35 pound per barrel to about 10 pounds per barrel.

6. A well drilling fluid comprising a clayey material, water, a separated component of the bark of a coniferous tree of the pine, tsuga, pseudotsuga and fir families selected from the group consisting of sclerenchyma tissue, parenchyma tissue, cork and admixtures thereof, the said bark component being present in an amount in the range of from 0.35 of a pound to about 10 pounds per barrel of fluid, and caustic soda in the proportion of about 1 part to 4 parts of the bark product.

7. A well drilling mud comprising an aqueous fluid mixture of hydrated clay in water, a comminuted bark product derived from the bark of a coniferous tree of the pine, tsuga, pseudotsuga and fir families consisting of approximately 10% cork, 40% fiber and 50% parenchyma tissue, and caustic soda in the proportion of about 1 part to 4 parts of bark fraction the proportion of the bark product to fluid being in the range of from 0.35 pound per barrel to about 10 pounds per barrel.

8. A well drilling fluid comprising a clayey material, water, a separated component of the bark of a coniferous tree of the pine, tsuga, pseudotsuga and fir families selected from the group consisting of sclerenchyma tissue, parenchyma tissue, cork and admixtures thereof, and caustic soda in the proportion of about 1 part to 4 parts of bark the proportion of the bark product to fluid being in the range of from 0.35 pound per barrel to about 10 pounds per barrel.

References Cited in the file of this patent

UNITED STATES PATENTS

| | | |
|---|---|---|
| 1,999,766 | Lawton et al. | Apr. 30, 1935 |
| 2,109,858 | Cannon | Mar. 1, 1938 |
| 2,280,995 | Booth | Apr. 28, 1942 |
| 2,549,142 | Thompson | Apr. 17, 1951 |
| 2,601,050 | Nestle | June 17, 1952 |

FOREIGN PATENTS

| | | |
|---|---|---|
| 605,173 | Great Britain | of 1948 |

OTHER REFERENCES

Langton: Fibrous Materials Aid Restoring Lost Drilling Well Circulation, Article in The Oil and Gas Journal, April 23, 1936.

Stern: Role of Clay and Other Minerals in Oil Well Drilling Fluids, Bureau of Mines Report of Investigations No. 3556. February 1941, pp. 67 and 68. (Copy in Div. 64.)

Weyerhaeuser Oil Well Drilling Products, Forms 911, 912, 913, and 914, also pamphlet on Improved Silvacel Fiber, 20 pages total printed matter, 1950.

Allen: Commercial Organic Analysis, vol. III, P. Blakiston's Son and Co., Philadelphia, Pa. (1900), page 23.

Rogers: Composition and Properties of Oil Well Drilling Fluids, Gulf Pub. Co., Houston, Texas (1948), pages 459 and 461.